United States Patent [19]

Brown

[11] 4,068,625
[45] Jan. 17, 1978

[54] ENGINE INTAKE AIR MOISTURIZER

[76] Inventor: Charles Lester Brown, 8801 SW. 116 St., Miami, Fla. 33176

[21] Appl. No.: 685,718

[22] Filed: May 12, 1976

[51] Int. Cl.² .............................................. F02D 19/00
[52] U.S. Cl. ............................ 123/25 A; 261/18 A; 261/99
[58] Field of Search ................ 123/25 R, 25 A, 25 L; 261/18 A, 104, DIG. 11, 99, DIG. 54

[56] References Cited

U.S. PATENT DOCUMENTS

| 1,430,803 | 10/1922 | Dunn et al. | 123/25 A |
| 1,465,828 | 8/1923 | Pate | 123/25 A |
| 2,811,146 | 10/1957 | Spellmann | 123/25 A |
| 2,843,216 | 7/1958 | Powell | 123/25 A |
| 3,403,531 | 10/1968 | Oesterheld | 261/DIG. 11 |
| 3,834,360 | 9/1974 | Blitch | 123/25 A |
| 3,991,724 | 11/1976 | Geiser | 123/25 R |

FOREIGN PATENT DOCUMENTS

| 123,077 | 1/1947 | Australia | 123/25 A |
| 965,487 | 9/1950 | France | 123/25 A |
| 401,497 | 8/1909 | France | 123/25 A |

Primary Examiner—Ronald H. Lazarus
Assistant Examiner—Ira S. Lazarus
Attorney, Agent, or Firm—Oltman and Flynn

[57] ABSTRACT

This apparatus for moisturizing the intake air going into an engine carburetor has one or more venturi passageways, each defined by a water permeable, porous body surrounded by water. The intake air is drawn into the venturi passageway where it becomes moisturized or humidified before going into the carburetor.

14 Claims, 10 Drawing Figures

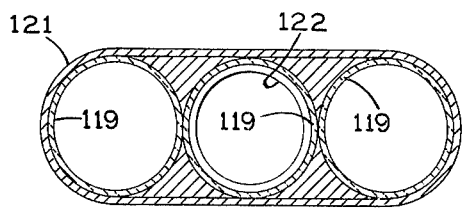
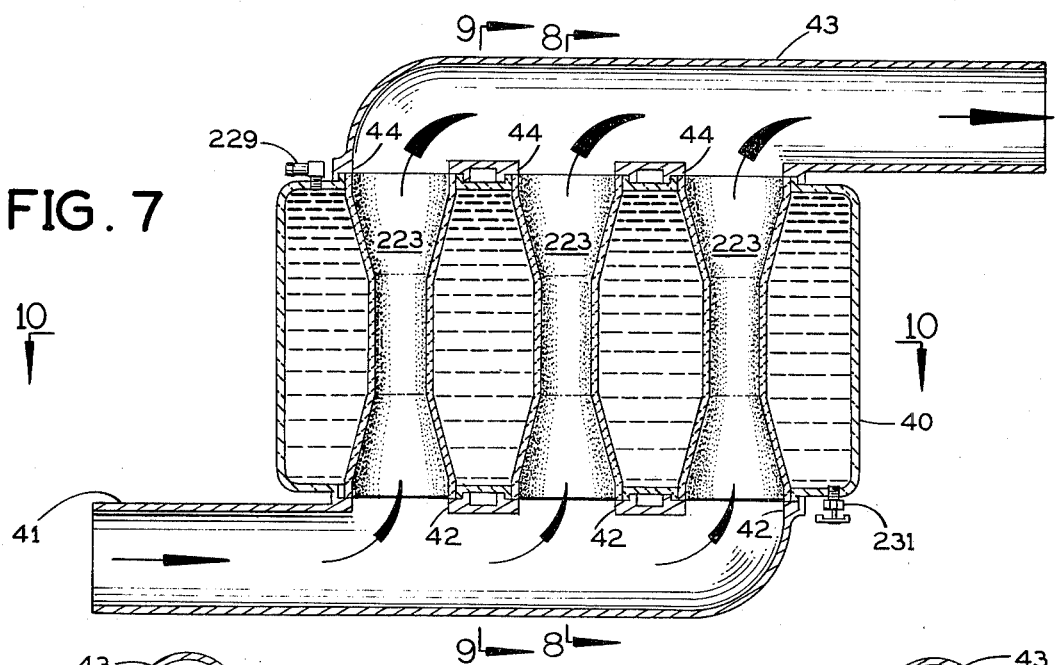
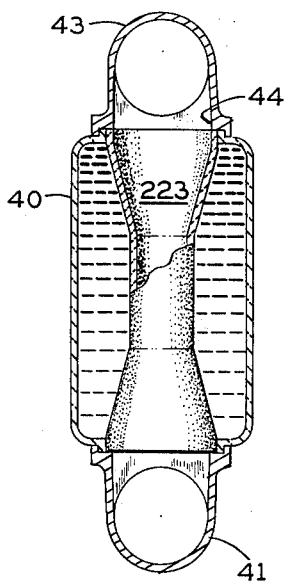
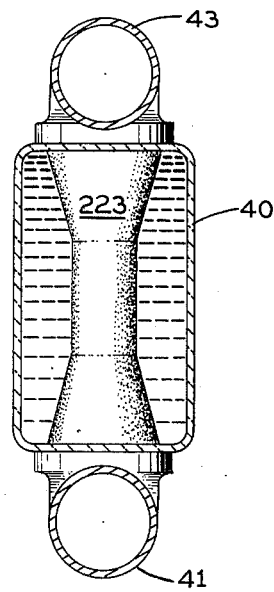
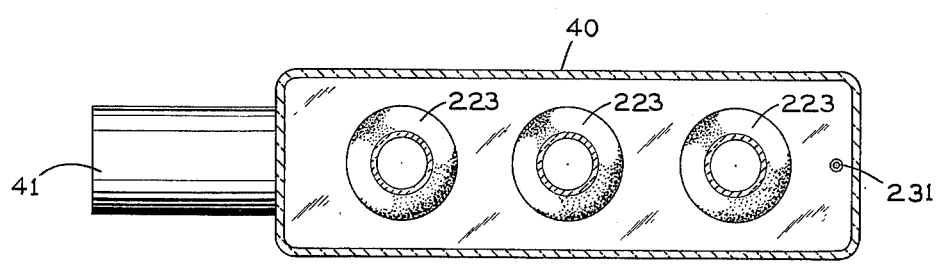

ENGINE INTAKE AIR MOISTURIZER

BACKGROUND OF THE INVENTION

Various proposals have been made heretofore for adding gaseous moisture to the air that is drawn into the carburetor of an internal combustion engine, particularly on automotive vehicles. Moisture added to the air is believed to reduce significantly the engine combustion temperature, and to avoid an excess of unburned hyrdocarbons a leaner gas-air mixture may be used in order to bring the engine combustion temperature up to what is considered a desirable level. The net results of moisturizing the intake air and using a leaner fuel mixture are believed to be a slower rate of combustion, a reduction of carbon monoxide emissions, a reduction of carbon deposits in the engine, a reduction of engine vibration, and significantly improved gas mileage.

One such moisturizer for an engine carburetor is disclosed in U.S. Pat. No. 3,834,360 to James A. Blitch.

SUMMARY OF THE INVENTION

The present invention is directed to an apparatus for introducing gaseous moisture into the air intake of an internal combustion engine which includes at least one porous body defining a venturi passage and surrounded by a water chamber. The air is drawn into the carburetor through the venturi passage where moisture is introduced into the air to improve the performance of the engine.

A principal object of this invention is to provide a novel and improved humidifier or moisturizer for the air intake of an internal combustion engine, particularly an engine on an automotive vehicle.

Another object of this invention is to provide such a moisturizer which introduces gaseous moisture into the engine intake air in such a molecularly divided state as to provide reliable operation with a wide range of engines, making it unnecessary to design the moisturizer for a particular engine.

Further objects and advantages of this invention will be apparent from the following detailed description of three presently-preferred embodiments thereof, which are shown in the accompanying drawings, in which:

FIG. 6 is a cross-section taken along the line 6—6 in FIG. 4;

FIG. 7 is a longitudinal section through a third embodiment of this invention having three vertical venturi passageways in parallel;

FIG. 8 is a vertical cross-section taken along the line 8—8 in FIG. 7;

FIG. 9 is a similar view taken along the line 9—9 in FIG. 7; and

FIG. 10 is a horizontal cross-section taken along the line 10—10 in FIG. 7.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Figure 1:
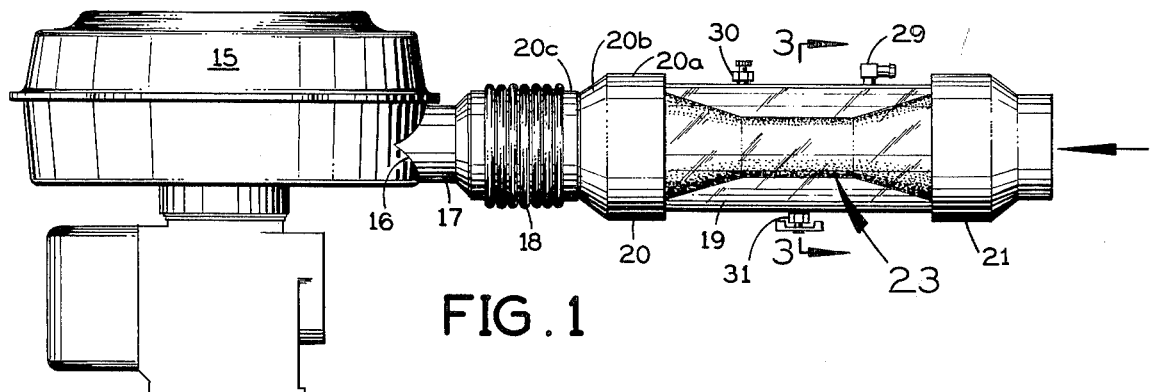
FIG. 1 is an elevational view of a first, single venturi embodiment of the present invention, shown attached to the air intake of a carburetor for an internal combustion engine on a motor vehicle.

Referring first to FIG. 1, the carburetor 15 for an internal combustion engine on an automobile has an air intake opening 16 at one side where the intake air moisturizer of the present invention is attached. In the particular example shown, a tubular metal fitting 17 extends around the air intake opening 16 and carries a corrugated sleeve 18 of wire-reinforced rubber or other suitable material, into which one end of the present intake air moisturizer may be tightly inserted.

Figure 2:
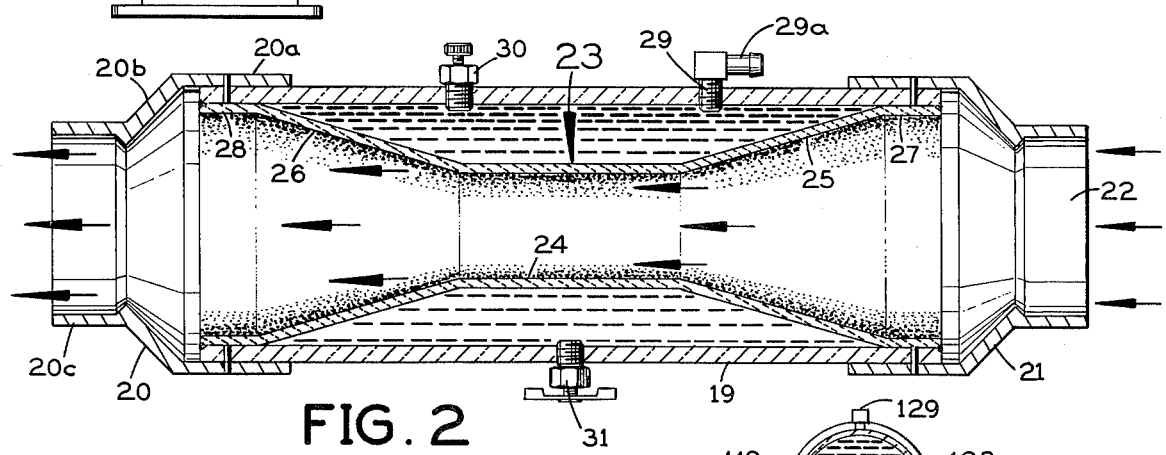
FIG. 2 is a longitudinal section through the moisturizer shown in FIG. 1.

As shown in FIG. 2, this moisturizer comprises an outer housing including an elongated, rigid, cylindrical tube 19, preferably of transparent material, and metal fittings 20 and 21 on the opposite ends of this tube. The fitting 20 has a cylindrical segment 20a at its right end in FIG. 2, which snugly receives and is fastened to the adjacent end of the tube 19 in liquid-tight fashion. Beyond this end of the tube 19, the fitting 20 presents an inwardly-tapering frusto-conical segment 20b and, at the opposite end of the latter, a smaller cylindrical segment 20c for snug insertion into the sleeve 18 on the carburetor fitting 17.

The fitting 21 on the opposite end of tube 19 is a mirror image of fitting 20, and its outer end presents an air inlet opening 22.

Mounted inside the tube 19 is an annular body 23 of water permeable, porous material. This body has a cylindrical throat 24 midway along its length, frusto-conical outwardly-tapering segments 25 and 26 at each end of the throat 24, and short, cylindrical, mounting segments 27 and 28 at the larger ends of the respective tapered segments 25 and 26 which are snugly received in and fastened to the tube 19 at the latter's opposite ends. The porous body 23 provides a venturi passageway extending along its length for passing air from the inlet opening 22 of the moisturizer to the air intake 16 of the carburetor at its opposite end.

The annular space around the venturi-spaced porous body 23 inside the housing tube 19 is filled with water, which migrates through the pores of the porous body and eventually evaporates into the air stream which is flowing lengthwise through the venturi passageway. The housing tube 19 carries on the top a generally L-shaped water inlet fitting 29 which at one end opens into this space and at its opposite end presents a nipple 29a for the attachment of a hose (not shown) for introducing water into the annular space around the porous body 23. Also on the top of the housing tube 19, a manually adjustable air vent 30 enables the escape of air from this space while it is being filled with water, after which the vent is closed. A water drain valve 31 is mounted on the bottom of the housing tube 19. This drain valve may be opened whenever it is desired to empty water from the annular space around the porous body 23.

In the operation of this apparatus, the ambient air drawn into the venturi passageway through the porous body 23 picks up moisture from the inside of the porous body in a molecularly divided state. The migration of water through the wall of the porous body 23 is most pronounced at its throat 24 because it is there that the air pressure is the least in the venturi passage, and, therefore, the pressure differential between the outside and the inside of the porous body is the greatest. This moisturizing or humidifying of the intake air for the carburetor improves the engine performance in several respects, such as, reducing noxious emissions from the engine, reducing carbon deposits in the engine, and improving the engine efficiency. The humidifying or moisturizing of the intake air has the effect of retarding the spark, so that a compensating advance of the spark should be made to insure optimum timing of the spark.

Practical experience with the present moisturizer has shown that it can be used with different carburetors and engines without the necessity of tailoring it to a specific application, as was found to be the case with previous moisturizers which introduced droplets of water into the intake air. It is believed that this improved universality and adaptability of the present moisturizer is due to the fact that it introduces water in a molecularly divided, gaseous state into the intake air, thus providing greater homogeneity of the moisturized air going into the carburetor.

It is believed that the present moisturizer may be used advantageously on diesel engines to reduce the smoke and other noxious emissions and to improve the engine efficiency.

Figure 3:
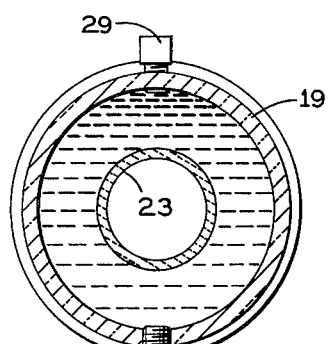
FIG. 3 is a vertical cross-section taken along the line 3—3 in FIG. 1.
Figure 5:
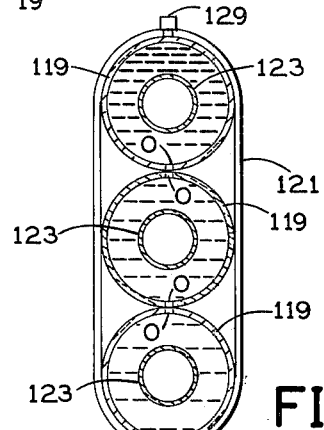
FIG. 5 is a vertical cross-section taken along the line 5—5 in FIG. 4.
Figure 4:
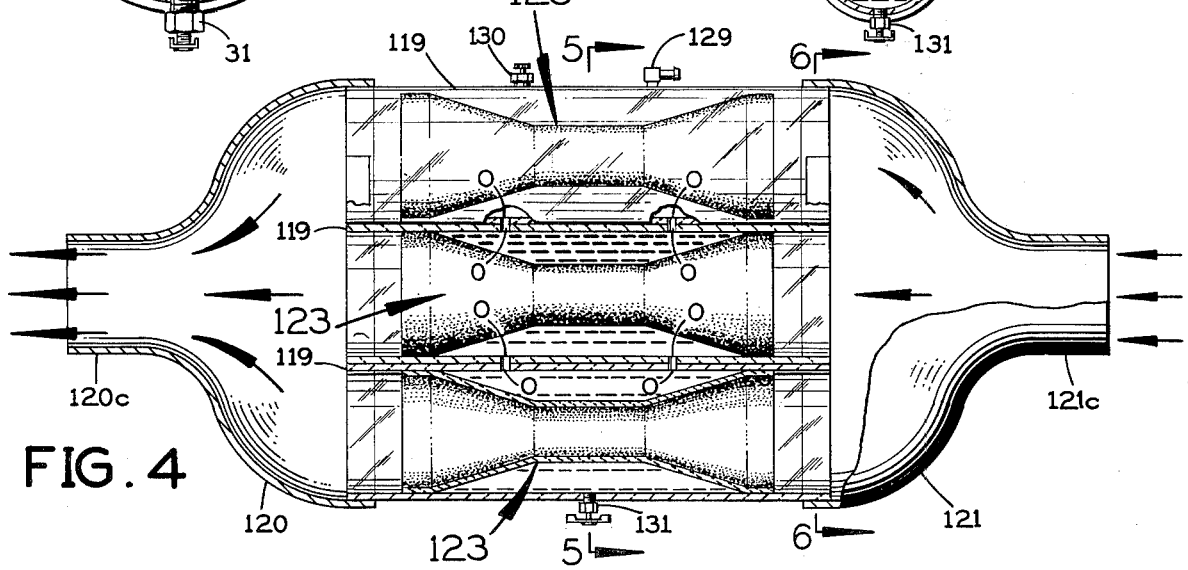
FIG. 4 is a longitudinal section through a second embodiment of the present moisturizer, having three horizontal venturi passageways in parallel.

FIGS. 4–6 show a second embodiment of this invention which has three horizontal venturi passageways arranged in parallel, one above the other, in the path for the intake air going into the carburetor. The passageway could be parallel in any plane. Elements of the apparatus for FIGS. 4–6 which correspond to elements of the first embodiment (FIGS. 1–3) are given the same reference numerals plus 100, and the detailed description of these similar elements will be omitted as repititious.

As shown in FIG. 5, the three housing tubes 119 are stacked vertically one above the other. The end fittings 120 and 121 are oblong in cross-section at their larger ends, where they receive the corresponding ends of the housing tubes 119, and they converge into respective cylindrical necks 120c and 121c away from the housing tubes 119.

Where the housing tubes 119 abut against each other they are formed with registering openings O (FIG. 4), so that the annular spaces around the respective venturi-shaped porous bodies 123 are in fluid communication with each other from top to bottom in the assembly. A single water inlet fitting 129 and a single vent valve 130 are provided on the top of the uppermost housing tube 119, and a single drain valve 131 is provided on the bottom of the lowermost housing tube 119 in the assembly.

The operation is essentially the same as in FIGS. 1–3, except that the inlet air flow is divided into the three parallel streams flowing through the venturi passageways. This gives proportionately greater direct exposure of the air to the moisturized walls of the venturi passageways and should improve the homogeneity of the combined moisturized air flow into the carburetor.

A similar effect is achieved by the embodiment shown in FIGS. 7–10, where the venturi passageways extend vertically, rather than horizontally. Elements of this apparatus which correspond to those in FIGS. 1–3 are given the same reference numerals plus 200.

In FIG. 7, three vertically-disposed, venturi-shaped, porous bodies 223 are arranged in succession along a water jacket 40, which is substantially rectangular in cross-section, as shwn in FIG. 10. An air inlet fitting 41 extends below the water jacket and has three successive outlet openings 42 at the top which communicate directly with the lower ends of the venturi passageways through the respective porous bodies 223. The air inlet fitting 40 is suitably connected in fluid-tight fashion to the bottom wall of the water jacket 40 and to the lower ends of the upwardly extending porous bodies 223. An air outlet fitting 43 is similarly mounted on top of the water jacket 40, presenting three openings 44 on the bottom which communicate directly with the upper ends of the respective porous bodies 223 to receive moisturized air therefrom.

In the operation of this apparatus, ambient air is drawn into the air inlet fitting 41 and is divided into three streams, which flow up through the venturi passageways through the outlet fitting 43 into the air intake opening of the carburetor.

The water jacket 40 is filled with water through an inlet fitting 229 (FIG. 7) at the top, and it may be emptied through a drain valve 231 at the bottom. A vent valve (not shown) may be provided on the water jacket to vent air from it when it is being filled with water.

From the foregoing it will be evident that the present invention may be embodied in various different structural arrangements, either with a single venturi passage or a multiplicity of them. The body which defines the venturi passage may be porous throughout its length, as disclosed, or it may be porous only at the venturi throat where the moisturizing effect is the greatest.

In each of the foregoing embodiments of the invention, the porous body or bodies may be of porous plastic, or fired porous clay, or other suitable porous hygroscopic material through which water can migrate for evaporation into the air stream flowing through its venturi passageway. The rate at which the air-moisturizing action takes place depends upon such design factors as the length of the venturi passageway and the diameter of its throat, the wall thickness of the porous body (particularly at its throat), and applied water pressure.

The moisturizer will reduce the frequency of tune-ups. It can be used on carbureted engines, fuel injection engines, engines with side draft carburetors, motorcycles, marine engines, fixed engine generators and pumps.

An air valve is not essential on the moisturizer. No separate water tank is required. The unit can be installed anywhere in the air intake line.

I claim:

1. A moisturizer for an engine carburetor comprising:
   an open-ended housing for connection at one open end to the air intake of the carburetor, said housing having an air inlet opening at its opposite end;
   an open-ended, annular body inside said housing defining a venturi passageway between its ends for conducting air from said air inlet opening of the housing to said air intake of the carburetor, said body having a reduced diameter throat at which air pressure in said body is at a minimum, and having tapered portions at both axial sides of said throat tapering outwardly therefrom, said body for at least a portion of its extent being spaced from said housing to define therewith a water chamber at the outside of said body, said body at said latter portion of its extent being porous to pass moisture from said water chamber for evaporation into the air flowing through said venturi passageway, said venturi passageway providing increased migration of water through said body at said throat due to the reduction of air pressure at said throat;

and means on said housing for introducing water into said chamber.

2. A moisturizer according to claim 1, wherein said body is porous at the throat of said venturi passageway.

3. A moisturizer according to claim 1, wherein said body is porous throughout substantially its complete length in said housing.

4. A moisturizer according to claim 1, wherein said last-mentioned means is a water inlet fitting on the top of said housing at said chamber, and said fitting has a tubular neck at the outside of the said housing for the attachment of a hose.

5. A moisturizer according to claim 1, and further comprising a vent valve on the top of said housing at said chamber for venting said chamber to the atmosphere while it is being filled with water.

6. A moisturizer according to claim 1, and further comprising a drain valve on the bottom of said housing for emptying the water from said chamber.

7. A moisturizer according to claim 4, and further comprising:

a vent valve on the top of said housing at said water chamber for venting said chamber to the atmosphere during the filling of said chamber with water;

and a drain valve on the bottom of said housing at said water chamber for draining water therefrom.

8. A moisturizer according to claim 1, and further comprising:

at least one additional open-ended body inside said housing defining a venturi passageway in parallel with the venturi passageway of said first-mentioned body for conducting air from said air inlet opening of the housing to said air intake of the carburetor, said additional body for at least a portion of its extent being spaced from said housing to define therewith a water chamber at the outside of said additional body, and said additional body at said portion of its extent being porous to pass moisture from said water chamber for evaporation into the air flowing through its venturi passageway.

9. A moisturizer according to claim 8, wherein said venturi passageways extend horizontally.

10. A moisturizer according to claim 8, wherein said venturi passageways extend upward from said air inlet opening of the housing to said air intake of the carburetor.

11. A moisturizer according to claim 8, wherein said housing comprises:

a respective housing tube enclosing each of said venturi passageway bodies, said tubes extending in adjoining parallel relationship and providing fluid communication between the respective water chambers outside said bodies;

an inlet fitting attached to said housing tubes at one end thereof and providing said air inlet opening of the housing leading into each of said venturi passageways;

and an outlet fitting attached to said housing tubes at the opposite end thereof and providing an outlet passage leading from each of said venturi passageways to the air intake of the carburetor.

12. A moisturizer according to claim 11, wherein said housing tubes and said venturi passageways extend horizontally.

13. A moisturizer according to claim 8, wherein said housing comprises:

a water jacket receiving all of said venturi passageway bodies;

an inlet fitting attached to said water jacket and having a single air inlet opening and a plurality of outlet openings which register respectively with said venturi passageways at one end;

and an outlet fitting attached to said water jacket and having a plurality of inlet openings which register respectively with said venturi passageways at the opposite end thereof, said outlet fitting having a single outlet opening for passing moisturized air into the air intake of the carburetor.

14. A moisturizer according to claim 13, wherein:

said venturi passageways extend vertically;

said inlet fitting is attached to the bottom of said water jacket;

and said outlet fitting is attached to the top of said water jacket.

* * * * *